United States Patent
Kravec et al.

(10) Patent No.: US 7,227,994 B2
(45) Date of Patent: Jun. 5, 2007

(54) METHOD AND APPARATUS FOR IMBEDDED PATTERN RECOGNITION USING DUAL ALTERNATING POINTERS

(75) Inventors: Kerry A. Kravec, Bethel Park, PA (US); Ali G. Saidi, Austin, TX (US); Jan M. Slyfield, San Jose, CA (US); Pascal R. Tannhof, Fontainebleau (FR)

(73) Assignee: International Business Machines Corporation, Armonk, NY (US)

( * ) Notice: Subject to any disclaimer, the term of this patent is extended or adjusted under 35 U.S.C. 154(b) by 907 days.

(21) Appl. No.: 10/393,296

(22) Filed: Mar. 20, 2003

(65) Prior Publication Data

US 2004/0184661 A1   Sep. 23, 2004

(51) Int. Cl.
*G06K 9/00* (2006.01)

(52) U.S. Cl. .................. 382/181; 704/221; 704/243; 704/276; 340/995.22; 706/48; 375/368; 382/159; 382/165; 382/170

(58) Field of Classification Search ............... 382/181
See application file for complete search history.

(56) References Cited

U.S. PATENT DOCUMENTS

| | | | | |
|---|---|---|---|---|
| 3,916,100 A * | 10/1975 | Azuma | ................ | 341/5 |
| 4,075,688 A * | 2/1978 | Lynch et al. | ................ | 711/200 |
| 4,145,738 A * | 3/1979 | Inoue et al. | ................ | 711/209 |
| 4,493,034 A * | 1/1985 | Angelle et al. | ................ | 713/100 |
| 4,500,776 A * | 2/1985 | Laser | ................ | 235/462.27 |
| 4,555,796 A * | 11/1985 | Sakoe | ................ | 704/241 |
| 4,673,816 A | 6/1987 | Matsui et al. | ................ | 250/556 |
| 4,754,490 A * | 6/1988 | Swonger | ................ | 382/170 |
| 4,779,210 A * | 10/1988 | Katsura et al. | ................ | 345/501 |
| 4,901,352 A * | 2/1990 | Watari | ................ | 704/238 |
| 5,070,478 A * | 12/1991 | Abbott | ................ | 715/531 |
| 5,127,055 A * | 6/1992 | Larkey | ................ | 704/244 |
| 5,230,045 A * | 7/1993 | Sindhu | ................ | 711/203 |
| 5,384,722 A * | 1/1995 | Dulong | ................ | 708/201 |
| 5,394,532 A * | 2/1995 | Belsan | ................ | 711/114 |
| 5,408,625 A * | 4/1995 | Narita et al. | ................ | 712/210 |
| 5,410,667 A | 4/1995 | Belsan et al. | ................ | 395/425 |
| 5,438,630 A * | 8/1995 | Chen et al. | ................ | 382/159 |
| 5,459,798 A * | 10/1995 | Bailey et al. | ................ | 382/218 |
| 5,533,148 A | 7/1996 | Sayah et al. | ................ | 382/240 |
| 5,560,039 A * | 9/1996 | Dulong | ................ | 712/24 |
| 5,717,908 A * | 2/1998 | Dulong | ................ | 712/221 |
| 5,757,409 A * | 5/1998 | Okamoto et al. | ................ | 347/230 |
| 5,825,921 A * | 10/1998 | Dulong | ................ | 382/181 |
| 5,864,867 A * | 1/1999 | Krusche et al. | ................ | 707/104.1 |
| 5,881,312 A * | 3/1999 | Dulong | ................ | 710/7 |
| 5,943,493 A * | 8/1999 | Teich et al. | ................ | 712/228 |
| 6,012,027 A * | 1/2000 | Bossemeyer, Jr. | ................ | 704/243 |
| 6,185,568 B1 * | 2/2001 | Douceur et al. | ................ | 707/10 |

(Continued)

*Primary Examiner*—Bhavesh M Mehta
*Assistant Examiner*—Sath V. Perungavoor
(74) *Attorney, Agent, or Firm*—Winstead PC

(57) ABSTRACT

A method and apparatus for finding a reference pattern (RP) with K elements imbedded in an input pattern IP with repeating substrings uses dual pointers to point to elements in the RP to compare with input elements sequentially clocked from the IP. The dual pointers are loaded with a pointer address corresponding to the first reference element in the RP and the pointer addresses are either incremented to the next position or are reset back to the address of the first reference element in response to results of comparing the reference element they access to the presently clocked input element and results of comparing their respective pointer addresses.

21 Claims, 6 Drawing Sheets

U.S. PATENT DOCUMENTS

| | | | |
|---|---|---|---|
| 6,202,106 B1 * | 3/2001 | Baxter | 710/22 |
| 6,285,686 B1 | 9/2001 | Sharma | 370/477 |
| 6,425,067 B1 * | 7/2002 | Chong et al. | 711/220 |
| 6,499,083 B1 * | 12/2002 | Hamlin | 711/112 |
| 6,691,219 B2 * | 2/2004 | Ma et al. | 711/219 |
| 6,856,981 B2 * | 2/2005 | Wyschogrod et al. | 706/48 |
| 6,912,526 B2 * | 6/2005 | Akaboshi | 707/6 |
| 7,024,537 B2 * | 4/2006 | Pickett et al. | 711/217 |
| 7,046,848 B1 * | 5/2006 | Olcott | 382/176 |
| 2002/0083297 A1 * | 6/2002 | Modelski et al. | 712/18 |
| 2004/0184661 A1 * | 9/2004 | Kravec et al. | 382/209 |

* cited by examiner

| | STATE | | | ACTION | |
|---|---|---|---|---|---|
| State | PTR 108 | PTR 208 | | PTR 108 | PTR 208 |
| 1 | Match | Match | | Increment | If PTR 108 and PTR 208 are at the same RE wait, otherwise increment |
| 2 | Match | No Match | | Reset to RE 1 | Increment |
| 3 | No Match | Match | | Increment | Reset to RE 1 |
| 4 | No Match | No Match | | Reset to RE 1 | Reset to RE 1 |

FIG. 5

METHOD AND APPARATUS FOR IMBEDDED PATTERN RECOGNITION USING DUAL ALTERNATING POINTERS

CROSS REFERENCE TO RELATED APPLICATIONS

This application is related to the following commonly owned copending U.S. patent applications:

Ser. No. 10/393,139 entitled "Method and Apparatus For Finding Repeated Substrings In Pattern Recognition" filed Mar. 20, 2003, and Ser. No. 10/393,146 entitled "Method and Apparatus For Performing Fast Closest Match In Pattern Recognition" filed Mar. 20, 2003, which are hereby incorporated by reference herein.

TECHNICAL FIELD

The present invention relates in general to pattern recognition systems, and in particular, to pattern recognition systems for finding each occurrence of an reference pattern (RP) within an input pattern (IP) with repeating substrings.

BACKGROUND INFORMATION

Recognizing patterns within a set of data is important in many fields, from speech recognition, image processing, seismic data, etc. Some image processors collect image data and then pre-process the data to prepare it to be correlated to reference data. Other systems, like speech recognition, are real time where the input data is compared in real time to reference data to recognize patterns. Once the patterns are "recognized" or matched to a reference, the system may output the reference. For example, a speech recognition system may output equivalent text corresponding to input speech patterns. Other systems, like biological systems may use similar techniques to determine sequences in molecular strings like DNA.

In some systems there is need to find RPs that are imbedded in a continuous data stream. In non-aligned data streams, there are some situations where occurrences of the RP may be missed if only a single byte by byte comparison is implemented. The situation where RPs may be missed occurs when there is a repeated or nested repeating substring patterns in the input stream or the IP being matched. An RP containing the desired sequence is loaded into storage where each element of the sequence has a unique address. An address register is loaded with the address of the first element of the RP that is to be compared with the first element of the IP. This address register is called a "pointer." In the general case a pointer may be loaded with an address that may be either incremented (increased) or decremented (decreased). The value of the element pointed to by the pointer is retrieved and compared with input elements that are clocked or loaded into a comparator.

FIG. 1 illustrates an IP 101 and an RP 102 where letters are used to illustrate data. The problem is to determine if the sequence "ABCD", found in the RP 102, appears in the sequence "ABCABCDAC" of IP 101. One technique for doing this is to have a PTR 108 that cycles through the RP 102 on a byte per byte basis. This is shown in the frames 103–107. Sequence 109 represents clock cycles relative to reading IP 101. At clock cycle 1, the input is an "A" and PTR 108 points to the first entry "A" in the sequence "ABCD" of the RP 102 for comparison. In this case, there is a match so the PTR 108 moves to the second entry in the RP 102 (B) to determine if it matches the letter "B" in the IP 101 read at clock cycle 2. In this case, there is again a match. PTR 108 moves to the third entry (C) in the RP 102 to determine if it matches the letter "C" in the IP 101 read at clock cycle 3. Through three clock cycles, the sequence ABC in RP 102 matches the sequence ABC in IP 101. PTR 108 is incremented and moves to the fourth and last entry "D" in the RP 102 which is compared to the letter read "A" in the IP 101 at clock cycle 4. At clock cycle 4, the sequence "D" of the RP 102 does not match the "A" of the IP 101. Since there is no match, PTR 108 returns to the first entry (A) of RP 102 to repeat the process of trying to find the entire RP "ABCD" in the IP. At clock cycle 5, the input is a "B" and this does not match the first entry "A" of the RP 102 accessed by PTR 108. The start of the sequence "ABCD" in IP 101, which starts at clock cycle 5, has been missed. Using a single PTR 108 requires the pointer to be pointing at the first entry in the RP when the same sequence is starting in the IP 101. Because of this, there is no guarantee that all imbedded patterns in an input data stream that match an RP will be found.

There is, therefore, a need for a method and an apparatus to ensure that imbedded patterns in an input data stream are not missed because the position of pointer to the RP does not coincide with the start of the desired pattern in the input pattern.

SUMMARY OF THE INVENTION

A method and apparatus for finding an embedded pattern in a data stream uses dual pointers, a first pointer and a second pointer. The dual pointers are used to identify which elements of the RP to compare to a corresponding input element of the IP presently being read. Initially both pointers point (contain the same pointer address) to the first reference element of the RP. When the first reference element in the RP matches the input element being read from the input data stream, a match is recorded and the first pointer is incremented and moves to the next reference element in the RP. This continues until the reference element in the RP pointed to by the first pointer does not match the input element being read from the input data stream. The reference element in the RP being pointed to by the second pointer is also compared to the input elements in the input data stream, however when the first and second pointer have the same address only the first pointer is incremented. Therefore, when the first pointer reference element fails to match an input element, a match of the second pointer reference element causes the second pointer to be incremented and the second pointer becomes the activated pointer (one whose pointer address is incremented on a compare.

When the first pointer reference element fails to match the input data stream its pointer address is reset to the first reference element in the RP. Comparison will continue between reference elements, pointed to by the second pointer and input elements in the input data stream. If the second pointer reference element fails to match a current input element in the input data stream, then the first pointer is incremented if it points to a reference element that compares with the current input element. This alternating will continue until the IP is exhausted or the desired imbedded reference pattern is found in the in put pattern. In this manner, imbedded patterns in the input data stream will not be missed because a single pointer to the RP was not in synchronization with the input data pattern.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 5 illustrates actions taken depending on matching conditions between the elements pointed to by the dual pointers and elements in the input data being read.

DETAILED DESCRIPTION

Figure 1:
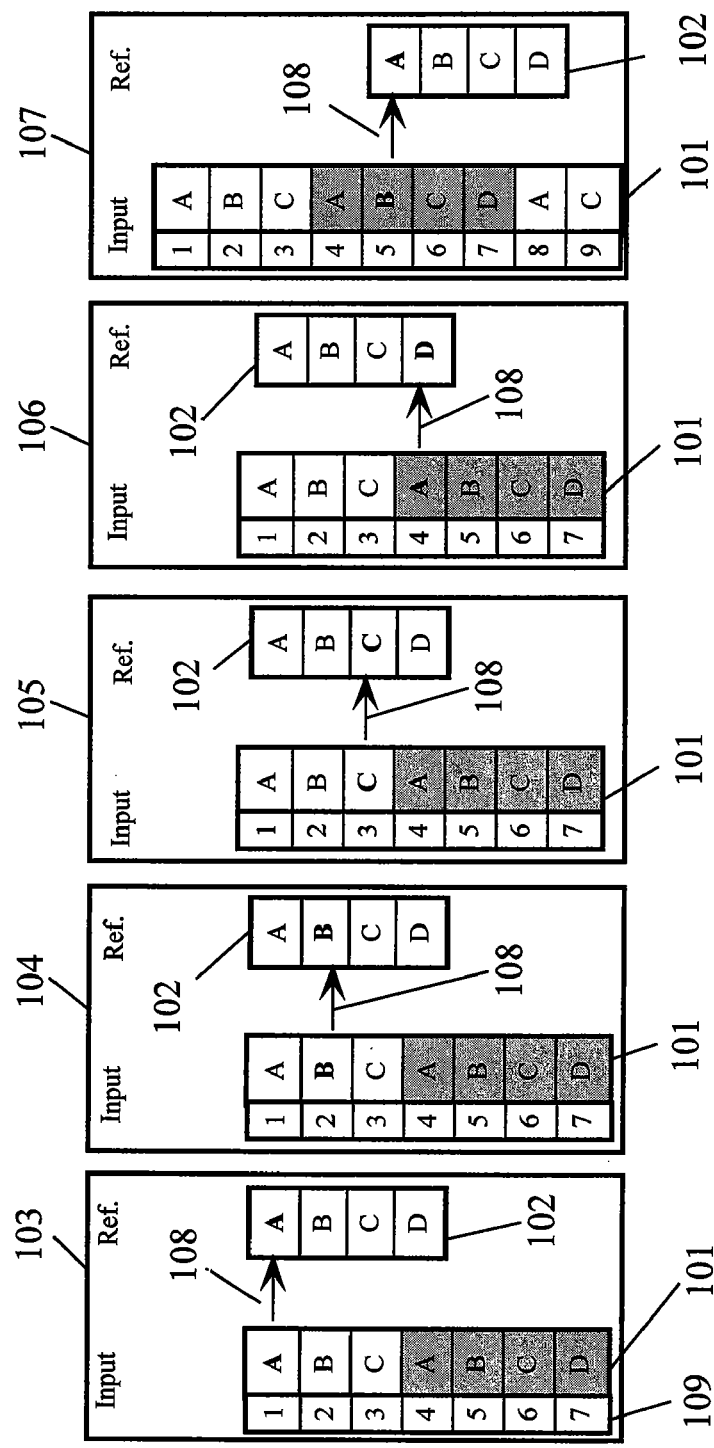
FIG. 1 is an example of how a desired imbedded pattern in an input data stream can be missed using a single pointer to an RP.

In the following description, numerous specific details are set forth to provide a thorough understanding of the present invention. However, it will be obvious to those skilled in the art that the present invention may be practiced without such specific details. In other instances, well-known circuits may be shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views. In the following, a pointer contains the address of an element that is used for some operation. The element at the pointer address could be in general another address or data. To simplify the explanation, the nth element in the RP may be simply written as reference element n or REn (e.g., the first element in the RP is RE1. Likewise the first element in the input pattern (IP) is written simply as IE1. As explained in the Background, a pointer contains an address of an element stored in an addressable storage unit. To make a comparison between an element in a stored RP and an input element in an input data pattern, a reference pointer is first loaded with the address of the desired element. The reference element is retrieved and loaded into a comparator. The input element is then clocked into the comparator where a comparison is made. Typically, the results of this comparison determine what is done with the address stored in the address pointer (incremented, reloaded, decremented). In this explanation, the terminology "a pointer compares" means that the "element at the address contained in the pointer compares." Unless stated otherwise, when it is said that a pointer was incremented, this means the address stored in the pointer was increased by one so that the pointer now contains the address of the next sequential element. Resetting or reloading a pointer means that a new address replaces the present address in the pointer. Resetting a pointer to a reference element N means that the pointer now contains the storage address of reference element N and not the value of reference element N itself. To distinguish between a comparison of the elements pointed to by pointers and a comparison of the addresses of the pointer themselves, the term "element" is used (e.g., reference element) refers to the element pointed to by the pointer and "pointer address" refers to the address contained in the pointer. Pointer address A compares to pointer address B, means the two pointers A and B contain the same address to an element. In the following, stating that pointer A compares to pointer B or pointer A compares to element C means that the element pointed to by the address in pointer A compares to the element pointed to by the address in pointer B or to the element C itself.

A reference element (RE) is one of the elements in a reference pattern (RP). In the following, "pointer reference element" may be used at times to refer to the particular RE pointed by a particular pointer. For example, the RE pointed to by a first pointer may be referred to as the "first pointer reference element" to distinguish it from a RE pointed to by a second pointer. This may be done to clarify the explanation. When it is stated that a pointer is "activated" in means that its pointer address is incremented if it matches a current IE.

Figure 2:
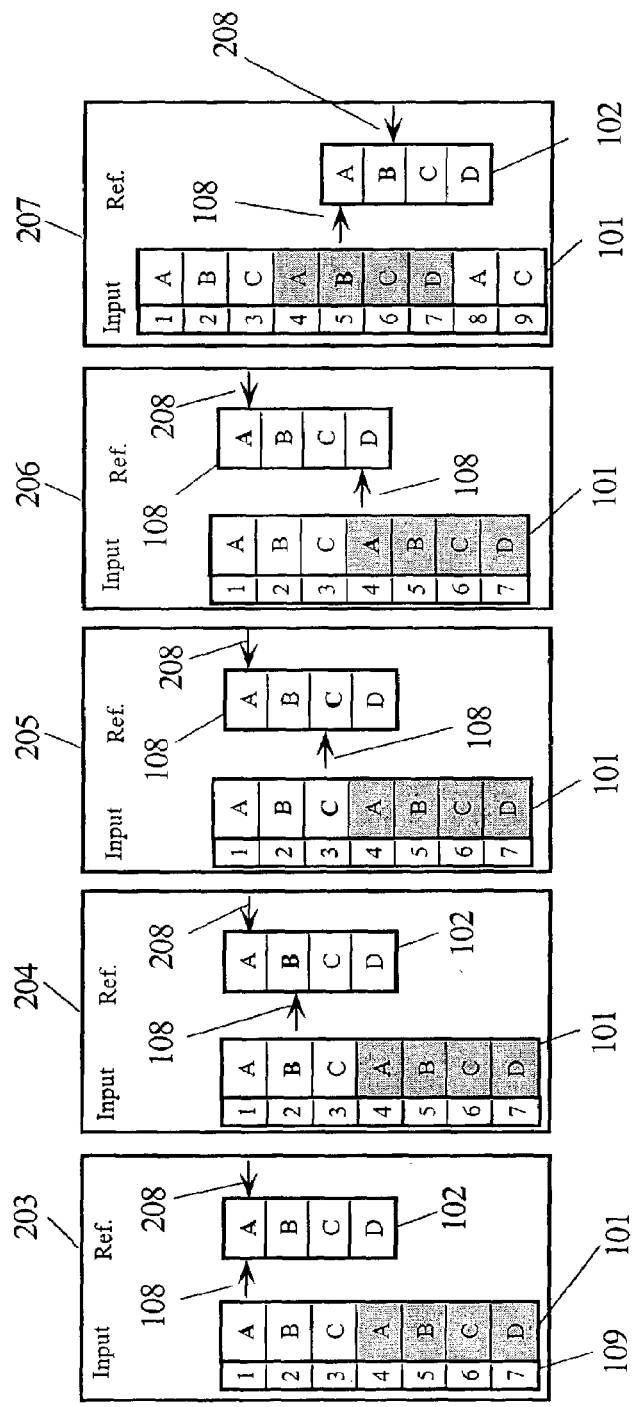
FIG. 2 illustrates how using two pointers according to embodiments of the present invention may be used to avoid missing a desired imbedded pattern in the input data stream.

FIG. 1 illustrated how a desired pattern in an input data stream may be missed using one pointer to select elements of an RP to be compared to elements in an IP. FIG. 2 illustrates how embodiments of the present invention can find the RP of FIG. 1 without missing. Frames 203–207 illustrate the sequence of events leading up to finding the desired RP 102. Dual pointers, pointer (PTR) 108 and PTR 208 are used to alternately indicate which reference element (RE) in reference pattern (RP) 102 is compared to the input element (IE) read from IP (IP) 101. Clock cycles 109 indicate which elements of the IP 101 are read at each cycle. At clock cycle 1, PTR 108 and PTR 208 both point to the first RE (RE1) of RP 102. Reference elements pointed by both 108 and PTR 208 are compared to the current IE. However, if PTR 108 and PTR 208 are pointing at the same element in RP 102, PTR 108 is first activated (moves in response to the result of a compare cycle). This is the case at clock cycle 1. At clock cycle 1, IE1 is an "A" and it compares to the "A" of RE1. A match is recorded and PTR 108 is moved to RE2 which is a "B". At clock cycle 2, IE2 is also a "B" and compares to RE2. Since PRT 208 was not incremented it still points to RE1 (A) and it does not match IE2 (B). A match is recorded and PTR 108 moves to RE3 which is a "C". At clock cycle 3, IE 3 is also a "C" and compares to RE3. A match is recorded and PTR 108 moves to RE4 which is an "D". At clock cycle 4, IE 4 is an "A" an it does not match RE4. No match is recorded and PTR 108 is reset to point to RE1. PTR 208, which continued to be compared to the IP, does match IE4 (A) at clock cycle 4. PTR 208 which has remained at RE1 (no matches until clock cycle 4) is activated as its reference element (RE1) compares to IE 4 which did not match RE4 pointed to by PTR 108. A match is recorded an comparisons continue with activated PTR 208 which is incremented to point to RE2. At clock cycle 5, IE 5 is a "B" and it compares to RE2 pointed to by PTR 208. A match is recorded and PTR 208 is incremented to point to RE3. At clock cycle 6, IE 6 is a "C" and it matches RE3. A match is recorded and PTR 208 is incremented to point to RE4 which is a "D". At clock cycle 7, IE 7 is a "D" and matches RE4. At clock cycle 7, the complete pattern of RP 102 is found in the input data 101. PTR 208 would continue to compare until it fails to match, at which time it is reset to the first RE. Comparison may continue as long as it is desired to look for occurrences of RP 102 or until the input data pattern is exhausted.

Figure 3:
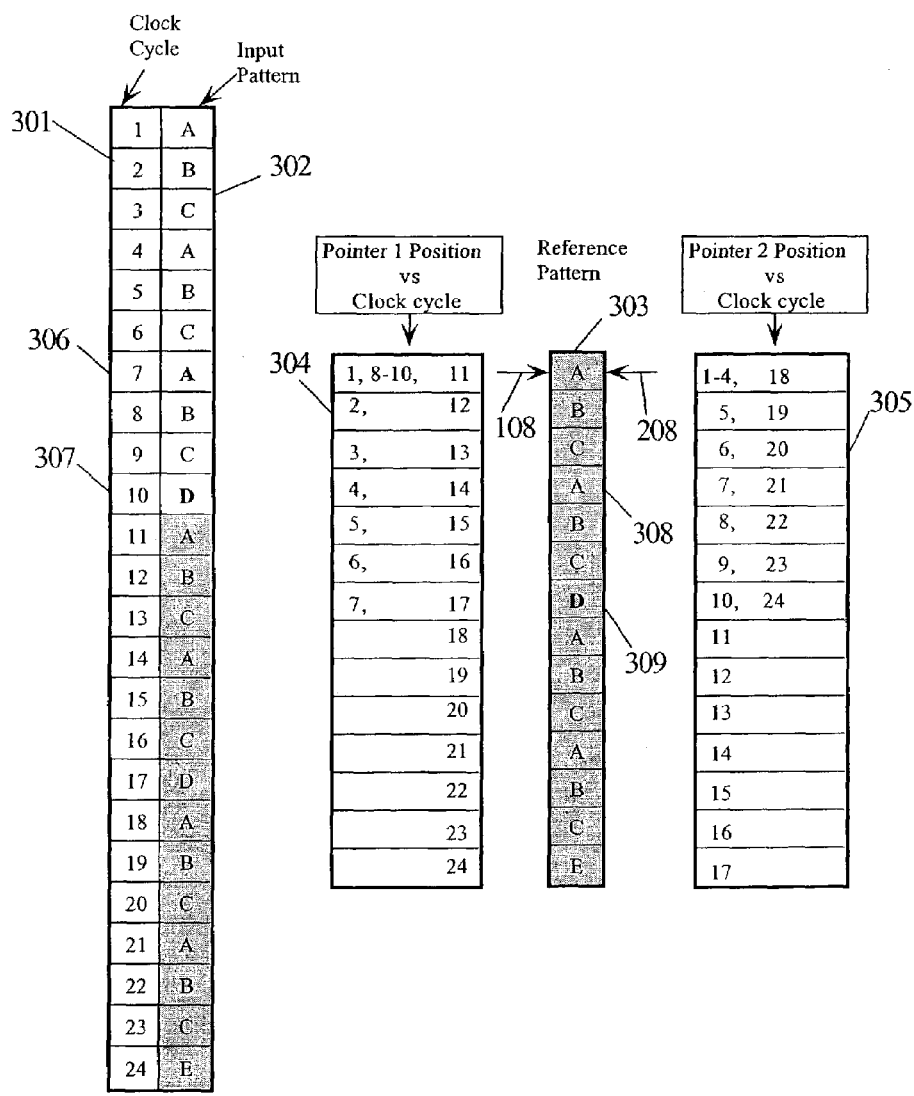
FIG. 3 illustrates how using two pointers may be used in complex nested input patterns according to embodiments of the present invention.

FIG. 3 illustrates a more complicated problem of an input pattern, having nested, repeating substrings (short patterns), is addressed using dual alternating pointers according to embodiments of the present invention. An example of a nested repeating substring is shown in FIG. 3. The IP has the pattern "ABC" repeated within the pattern "ABCABCABC" and the pattern "ABCABC" is also repeated within the pattern "ABCABCDABCABCE." This case, where there are nested repeated patterns, makes it more complicated to detect the RP "ABCABCDABCABCE". Using dual pointers according to embodiments of the present invention enables this pattern to be detected.

At clock cycle 1, PTR 108 and PTR 208 both point to RE1 of RP 303. In this embodiment, when both pointer point to the same element in RP 303, PTR 108 is first activated (moves in response to the result of a compare cycle). At clock cycle 1, IE1 is an "A" and it compares to the "A" of RE1. A match is recorded and PTR 108 is moved to RE2 which is a "B". PTR 108 continues to match the elements of IP 302 until it does not match a sequential element in IP 302. In this embodiment, PTR 208 is likewise comparing to IP 302, however it does not start comparison until it one clock cycle after PTR 108 if they are at the same RE. It is not incremented unless it matches an element of IP 302 and it is not pointing to the same element of RP 303 as PTR 108. At clock cycle 4, PTR 208 points to RE1 and matches IE 4. Also, PTR 208 and PTR 108 point to different elements of RP 303. PTR 108 continues to match IP 302 until clock cycle 7 where IE 7 does not match RE7. At this point, PTR 108 resets back to RE1 and again looks for matches in IP 302. PTR 208 started to match IP 302 at clock cycle 4. At clock cycle 7, PTR 208 is pointing to RE4 and IE 7 matches RE4. PTR 208 matches IP 302 from clock cycle 7 until clock cycle 17. Meanwhile, PTR 108 (again at RE1) finds a match in IP 302 at clock cycle 11 where RE1 and IE11 match and PRT 108 and PTR 208 are not at the same element in RP 303. PTR 208 and PTR 108 continue to match IP 302 until clock cycle 17 where PTR 208 is at RE14. At this point, IE17 (D) fails to match RE14 (E). PTR 208 is reset back to RE1 and PTR 108 continues to match IP 302. PTR 108 continues to match elements of IP 302 until clock cycle 24 where the entire pattern of RP 303 is found. PTR 208 again matches IP 302 at clock cycle 18 and continues to match through clock cycle 24 where it is at RE14.

Figure 4:
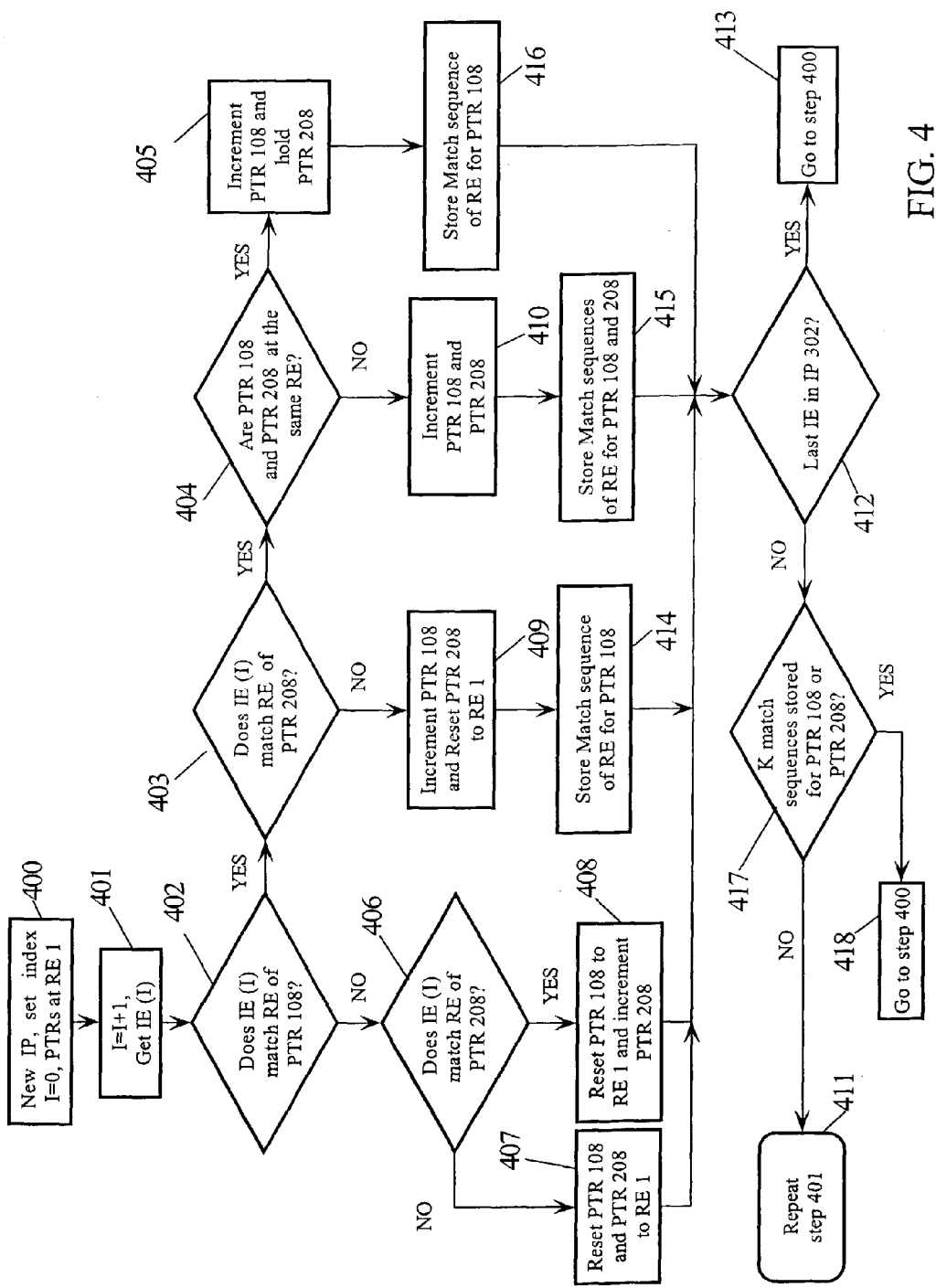
FIG. 4 is a flow diagram of method steps used in embodiments of the present invention.

FIG. 4 is a flow diagram of method steps used in embodiments of the present invention. In step 400, index I is set to zero and PTR 108 and PTR 208 are set to RE1, the first element in the RP 303. In step 401, index I is incremented by one and the element IE (I)(for first pass it is IE1) is clocked into the comparator. In step 402, a test is done to determine if IE (I) matches the RE pointed to by PTR 108. If the result of the test in step 402 is NO, then in step 406 a test is done to determine if IE (I) matches the RE pointed to by PTR 208. If the result of the test in step 406 is NO, then in step 407 both PTR 108 and PTR 208 are reset to RE1 and step 401 is again executed. If the result of the test in step 408 is YES, then in step 408 PTR 108 is reset to RE1 and PTR 208 is incremented. A branch is then taken to step 412 which will be explained later.

If the result of the test in step 402 is YES, then in step 403 a test is done to determine of IP (I) also matches the RE pointed to by PTR 208. If the result of the test in step 403 is NO, then PTR 108 is incremented and PTR 208 is reset to RE1 in step 409. Then in step 414 the successful matches are accumulated into a match sequence for PTR 108. A branch is again taken to step 412. If the result of the test in step 403 is YES, then a test is done to determine if PTR 108 and PTR 208 both point to the same RE in step 404. If the result of the test in step is YES, then in step 405 PTR 108 is incremented and PTR 208 is held and a branch is taken again to step 412. If the result of the test in step 404 is NO, then both PTR 108 and PTR 208 are incremented in step 410. Then in step 415, the successful matches are accumulated into match sequences for PTR 108 and PTR 208. At this time, it is not known which of the pointers will end up finding a match in IP 302. In this case, both PTRs are comparing elements (different elements) of RP 303 to IP 302. From step 410, a branch is taken to step 412. When a branch is taken to step 412, a test is done to determine if the last IE in IP 302 has been read to be compared. If the result of the test in step 412 is YES, then a branch is taken to step 400 and a new IP may be started. If the result of the test in step 412 is NO, then there remain IEs in IP 302 that may need to be processed. Then in step 417, a test is done to determine if either of the accumulated match sequences have a complete match to the RP 303. If the result of the test in step 417 is No, then in step 411 a branch is taken back to step 401 where index I is incremented to read in the next IE (I). If the result of the test in step 417 is YES, then a match is found and a branch is taken back to step 400 where a new pattern recognition process may be started.

FIG. 5 is a table listing the possible states of PTR 108 and PTR 208 and the actions that are taken in each set of states. In state 1, both PTR 108 and PTR 208 match the present IE (at present clock cycle). In state 1, PRT 108 is always incremented to the next RE. However, PTR 208 has two possible actions, it waits at its present RE if it is at the same RE as PTR 108 or it is incremented to its next RE if it is not at the same RE as PTR 108. In state 2, PTR 108 matches the present IE and PTR 208 does not match the present IE. In state 2, PTR 108 is incremented and PTR 208 is reset to RE1. In state 3, PTR 108 does not match the present IE and PTR 208 does match the present IE. In state 3, PTR 108 is reset to RE1 and PTR 208 is incremented. Finally in state 4, both PTR 108 and PTR match the present IE. In state 4, both PTR 108 and PTR 208 are incremented to their respective next REs.

Figure 6:
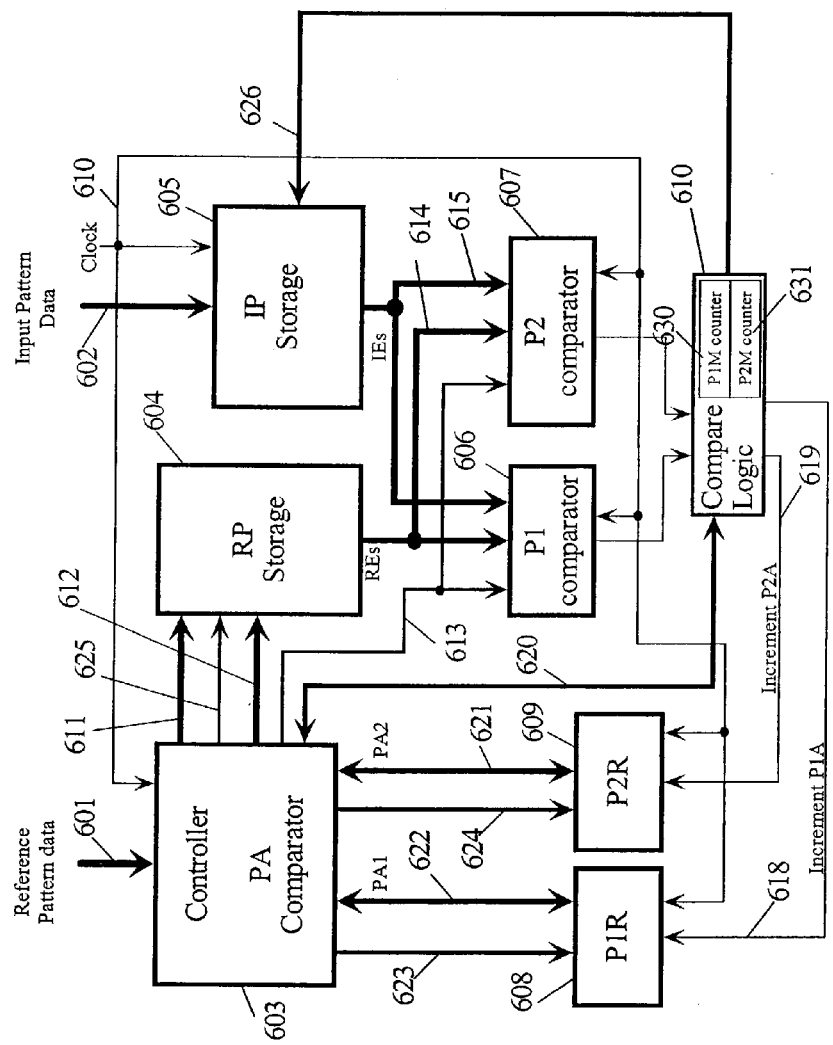
FIG. 6 is a block diagram of circuitry for comparing an RP to an IP using dual pointers according to embodiments of the present invention.

FIG. 6 is a block diagram of system 600 for comparing an RP (RP) defined by RP data 611 to an IP (IP) 602 using dual pointers. The first pointer address (P1A) is stored in register 608 and the second pointer address (P2A) is stored in register 609. Controller 603 contains logic that loads RP data 611 in to RP storage 604 in response to control signals in input 601. Controller 603 would determine the address for storing the first and subsequent reference elements (REs) in RP storage 604. Controller 603 would generate the addresses 612 and read/write control signals 625. The address of the first RE (RE1) is stored in controller 603 as it is used to load first pointer register (P1R) 608 and second pointer register (P2R) 609 in response to signals 620 received from compare logic 610. Clock 610 is used to synchronize or clock in input data. Clock 610 is distributed to circuitry that needs to synchronize its operations with particular clock cycles. The circuitry in system 600 may have counters to keep track of particular clock cycles relative to reading IP data 602. IP data 602 may be buffered or stored in IP unit 605 and sequentially clocked out by clock 610.

To initialize the system 600, both P1R 608 and P2R 609 are loaded with the pointer address (PA) corresponding to RE1 in RP storage 604. At the beginning of a pattern recognition cycle, the P1A 622 and P2A 623 are used to load a first reference element RE1 corresponding to P1A 622 into P1 comparator 606 and RE2 corresponding to P2A 623 into P2 comparator 607. PE1 and PE2 are compared to an IE in P1 comparator 606 and P2 comparator 607. P1A 622 and P2A 621 are compared in controller 603 to determine if the pointers point to the same RE. The results of the P1A 622 and P2A 621 compare are coupled to compare logic 610 in signals 620. Compare logic 610 generates increment signals, increment P2A 619 and increment P1A 618, in response to compare signals 616 and 617 and the result of the P1A 622 and P2A 621 compare (in signals 620). When P1A 622 and P2A 621 are incremented, they access new REs from RP 611 stored in R1P storage 604. Compare logic 610 has a P1M counter 630 to keep track of consecutive matches for REs accessed by pointer one (P1) and a P2M counter 631 to keep track of consecutive matches for P2. The P1M counter 630 and P2M counter 631 are reset to zero if the respective RE 614 accessed by P1 or RE 614 accessed by P2 fail to match an IE 615 being clocked. A number R, defining the total number of REs in RP 611, is sent to compare logic 610 by controller 603. If either count value in P1M counter 630 or the P2M counter 631 compares to R, then an occurrence of RP 611 has been found in the IP 602. Compare logic 610 also keeps track of which particular IE 615 generates a match to an RE 614 accessed by P1 or RE 614 accessed by P2 so that the location of RP 611 in the IP 602 is determined. IP unit 605 may store addresses of IP 602 each time there is a match in response to signals 626.

Although the present invention and its advantages have been described in detail, it should be understood that various changes, substitutions and alterations can be made herein without departing from the spirit and scope of the invention as defined by the appended claims.

What is claimed is:

1. A method for finding an occurrence of a reference pattern having K reference elements in an input pattern having M sequential input elements comprising the steps of:
   (a) loading a first reference address, corresponding to a first reference element in said reference pattern, into a first pointer register as a first pointer address and into a second pointer register as a second pointer address;
   (b) comparing a first input element of said input pattern to a first pointer reference element from said reference pattern corresponding to said first pointer address and comparing said first input element to a second pointer reference element from said reference pattern corresponding to said second pointer address;
   (c) incrementing said first pointer address if said first pointer reference element matches said first input element;
   (d) incrementing said second pointer address if said second pointer reference element matches said first input element and said second pointer address does not match said first pointer address;
   (e) incrementing said second pointer address if said second pointer reference element matches said first input element and said first pointer reference element does not match said first input element;
   (f) resetting said first pointer address to said first reference address if said first pointer reference element does not match said first input element;
   (g) resetting said second pointer address to said first reference address if said second pointer reference element does not match said first input element; and
   (h) selecting a next sequential element from said M input elements as said first input element and repeating steps (a)–(g).

2. The method of claim 1, further comprising the steps of:
   incrementing a first index value each time there is a match of said first pointer reference element to an input element and resetting said first index value to zero each time said first pointer reference element does not match an input element;
   incrementing a second index value each time there is a match of said second pointer reference element to an input element and resetting said second index value to zero each time said second pointer reference element does not match an input element; and
   repeating steps (a)–(h).

3. The method of claim 2, further comprising the steps of:
   outputting an indication of where in said input pattern said reference pattern matches a sequence of said input pattern when either said first sequence value or said second sequence value has a value of K; and
   resetting said first and second index values to zero.

4. The method of claim 2, further comprising the step of:
   processing a second input pattern or stopping if said number M of said input elements of said first input pattern have been processed before either said first sequence or said second sequence has a value of K.

5. A system for finding a reference pattern with K elements imbedded in an input pattern comprising:
   first and second pointer registers;
   circuitry for loading a first reference address, corresponding to a first reference element in said reference pattern, into a first pointer register as a first pointer address and into a second pointer register as a second pointer address;
   circuitry for comparing a first input element of said input pattern to a first pointer reference element from said reference pattern corresponding to said first pointer address and comparing said first input element to a second pointer reference element from said reference pattern corresponding to said second pointer address;
   circuitry for incrementing said first pointer address if said first pointer reference element matches said first input element;
   circuitry for incrementing said second pointer address if said second pointer reference element matches said first input element and said second pointer address does not match said first pointer address;
   circuitry for incrementing said second pointer address if said second pointer reference element matches said first input element and said first pointer reference element does not match said first input element;
   circuitry for resetting said first pointer address to said first reference address if said first pointer reference element does not match said first input element;
   circuitry for resetting said second pointer address to said first reference address in said if said second pointer reference element does not match said first input element; and
   circuitry for selecting a next sequential element from said M input elements as said first input element.

6. The system of claim 5, further comprising:
circuitry for incrementing a first index value each time there is a compare of said first pointer reference element to an input element;
circuitry for resetting said first index value to zero each time said first pointer reference element does not match an input element;
circuitry for incrementing a second index value each time there is a compare of said second pointer reference element to an input element; and
circuitry for resetting said second index value to zero each time said second pointer reference element does not match an input element.

7. The system of claim 6, further comprising:
circuitry for outputting an indication of where in said input pattern said reference pattern matches a sequence of said input pattern when either said first index value or said second index value is equal to K; and
circuitry for resetting said first and second index values to zero.

8. The system of claim 7, further comprising circuitry for processing a second input pattern if all elements of said first input pattern have been processed.

9. The system of claim 7, further comprising circuitry for processing a second input pattern if either said first index value or said second index value is equal to K before all elements of said first input pattern have been processed.

10. A method for finding an occurrence of a reference pattern having K reference elements in an input pattern having M sequential input elements comprising the steps of:
(a) comparing a first input element of said input pattern to a first pointer reference element from said reference pattern stored at a first pointer address and comparing said first input element to a second pointer reference element from said reference pattern stored at a second pointer address;
(b) incrementing said first pointer address if said first pointer reference element matches said first input element;
(c) incrementing said second pointer address if said second pointer reference element matches said first input element and said second pointer address does not match said first pointer address; and
(d) incrementing said second pointer address if said second pointer reference element matches said first input element and said first pointer reference element does not match said first input element.

11. The method of claim 10, further comprising the steps of:
resetting said first pointer address to a first reference address corresponding to a first reference element in said reference pattern if said first pointer reference element does not match said first input element; and
resetting said second pointer address to said first reference address if said second pointer reference element does not match said first input element.

12. The method of claim 11, further comprising the steps of:
selecting a next sequential element from said M input elements as said first input element and repeating steps (a)–(d).

13. The method of claim 12, further comprising the steps of:
incrementing a first index value each time there is a compare of said first pointer reference element to an input element and resetting said first index value to zero each time said first pointer reference element does not match an input element; and
incrementing a second index value each time there is a compare of said second pointer reference element to an input element and resetting said second index value to zero each time said second pointer reference element does not match an input element.

14. The method of claim 13, further comprising the steps of:
outputting a location in said input pattern where said reference pattern matches a sequence of said input pattern when either said first index value or said second index value is equal to K; and
resetting said first and second index values to zero.

15. The method of claim 13, further comprising the step of: processing a second input pattern or stopping if said number M of said input elements of said first input pattern have been processed before either said first index value or said second index value is equal to K.

16. A system for finding a reference pattern with K elements imbedded in an input pattern comprising:
a first and second pointer register;
circuitry for loading a first reference address, corresponding to a first reference element in said reference pattern, into a first pointer register as a first pointer address and into a second pointer register as a second pointer address;
circuitry for comparing a first input element of said input pattern to a first pointer reference element from said reference pattern corresponding to said first pointer address and comparing said first input element to a second pointer reference element from said reference pattern corresponding to said second pointer address;
circuitry for incrementing said first pointer address if said first pointer reference element matches said first input element;
circuitry for incrementing said second pointer address if said second pointer reference element matches said first input element and said second pointer address does not compares to said first pointer address; and
circuitry for incrementing said second pointer address if said second pointer reference element matches said first input element and said first pointer reference element does not match said first input element.

17. The system of claim 16, further comprising:
circuitry for resetting said first pointer address to said first reference address if said first pointer reference element does not match said first input element;
circuitry for resetting said second pointer address to said first reference address in said if said second pointer reference element does not match said first input element; and
circuitry for selecting a next sequential element from said M input elements as said first input element.

18. The system of claim 17, further comprising:
circuitry for incrementing a first index value each time there is a compare of said first pointer reference element to an input element;
circuitry for resetting said first index value to zero each time said first pointer reference element does not match an input element;
circuitry for incrementing a second index value each time there is a compare of said second pointer reference element to an input element; and circuitry for resetting said second index value to zero each time said second pointer reference element does not match an input element.

19. The system of claim 18, further comprising:

circuitry for outputting an indication of where in said input pattern said reference pattern matches a sequence of said input pattern when either said first index value or said second index value is equal to K; and circuitry for resetting said first and second index values to zero.

20. The system of claim 19, further comprising circuitry for processing a second input pattern if all elements of said first input pattern have been processed.

21. The system of claim 19, further comprising circuitry for processing a second input pattern if either said first index value or said second index value is equal to K before all elements of said first input pattern have been processed.

* * * * *